United States Patent
Liao et al.

(10) Patent No.: US 9,025,674 B2
(45) Date of Patent: May 5, 2015

(54) METHOD FOR RECONSTRUCTING DIGITAL VIDEO DATA STREAM AND APPARATUS THEREOF

(75) Inventors: Yi-Ying Liao, Hsinchu Hsien (TW); Chien-Jen Hung, Hsinchu Hsien (TW); Tai-Lai Tung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 864 days.

(21) Appl. No.: 12/766,268

(22) Filed: Apr. 23, 2010

(65) Prior Publication Data
US 2010/0284472 A1 Nov. 11, 2010

Related U.S. Application Data

(60) Provisional application No. 61/176,953, filed on May 11, 2009.

(51) Int. Cl.
| | |
|---|---|
| H04N 7/12 | (2006.01) |
| H04L 27/00 | (2006.01) |
| H04L 27/28 | (2006.01) |
| H04L 27/06 | (2006.01) |
| H04L 7/00 | (2006.01) |
| H04N 21/43 | (2011.01) |
| H04N 21/434 | (2011.01) |
| H04N 21/4385 | (2011.01) |

(52) U.S. Cl.
CPC .............. *H04N 21/4305* (2013.01); *H04N 7/12* (2013.01); *H04L 27/28* (2013.01); *H04L 27/00* (2013.01); *H04L 27/06* (2013.01); *H04N 21/4344* (2013.01); *H04N 21/4346* (2013.01); *H04N 21/4385* (2013.01)

(58) Field of Classification Search
None
See application file for complete search history.

(56) References Cited

U.S. PATENT DOCUMENTS

| | | | |
|---|---|---|---|
| 2004/0073929 A1* | 4/2004 | Morello | 725/63 |
| 2009/0083606 A1* | 3/2009 | Choi et al. | 714/776 |
| 2011/0188588 A1* | 8/2011 | Ko et al. | 375/260 |

OTHER PUBLICATIONS

Frame structure channel coding and modulation for a second generation digital terrestrial television broadcasting system (DVB-T2), DVB Document A122r1, Jan. 2008, European Telecommunications Standards Institute (ETSI).*

* cited by examiner

*Primary Examiner* — Joseph Ustaris
*Assistant Examiner* — William Adrovel
(74) *Attorney, Agent, or Firm* — Edell, Shapiro & Finnan, LLC (57) ABSTRACT

An apparatus for reconstructing digital video data stream reconstructs a transport stream from a first data stream and a second data stream. Both of the first data stream and the second data stream comprise a plurality of packets, a plurality of input stream time reference (ISCR) values, and a plurality of deleted null packet (DNP) values. The apparatus includes a packet interval detector, that estimates a packet interval according to the first data stream or the second data stream; an alignment unit, that generates an alignment signal according to the ISCR values and the packet interval; an oscillator, coupled to the packet interval detector, that generates an output pulse signal; and a reconstruction controller, that reconstructs the transport stream from the first data stream and the second data stream and outputs the transport stream according to the alignment signal and the output pulse signal. The alignment unit includes a fine tuner for fine tuning a frequency of the output pulse signal according to the ISCR values and a local count.

20 Claims, 9 Drawing Sheets

METHOD FOR RECONSTRUCTING DIGITAL VIDEO DATA STREAM AND APPARATUS THEREOF

CROSS REFERENCE TO RELATED PATENT APPLICATIONS

This patent application claims priority from U.S. Provisional patent application No. 61/176,953, filed on May 11, 2009, which is hereby incorporated in its entirety by reference.

TECHNICAL FIELD

The present disclosure relates to processing of television (TV) signals, and more particularly, to a method for reconstructing a digital video data stream and an apparatus thereof.

BACKGROUND OF THE PRESENT DISCLOSURE

In a digital communication system, the Moving Picture Experts Groups 2 (MPEG-2) transport stream standard is a detail specification with respect to compression solutions and system layers in various types of applications of standard definition TV (SDTV) and high definition TV (HDTV). In the MPEG-2 standard, in order to combine one or more audio streams, video streams or other basic data streams to a single or a plurality of data streams that are more adaptive to store or transmit, the streams need to be repacked and re-encoded. Moreover, various time marks, information of system control, and the like, are inserted in a transport stream, which is then transmitted to a channel encoder and a modulator. At a broadcasting transmitting end, the video streams, the audio streams and the data information streams are combined to a single transport stream to be modulated and transmitted through an air medium via electric waves. At a receiving end, a received digital modulated signal is demodulated in order to restore the original transport stream; later on, the original transport stream is segmented and parsed to images, voices and other information, so as to display images of programs on a monitor, for example.

Figure 1:
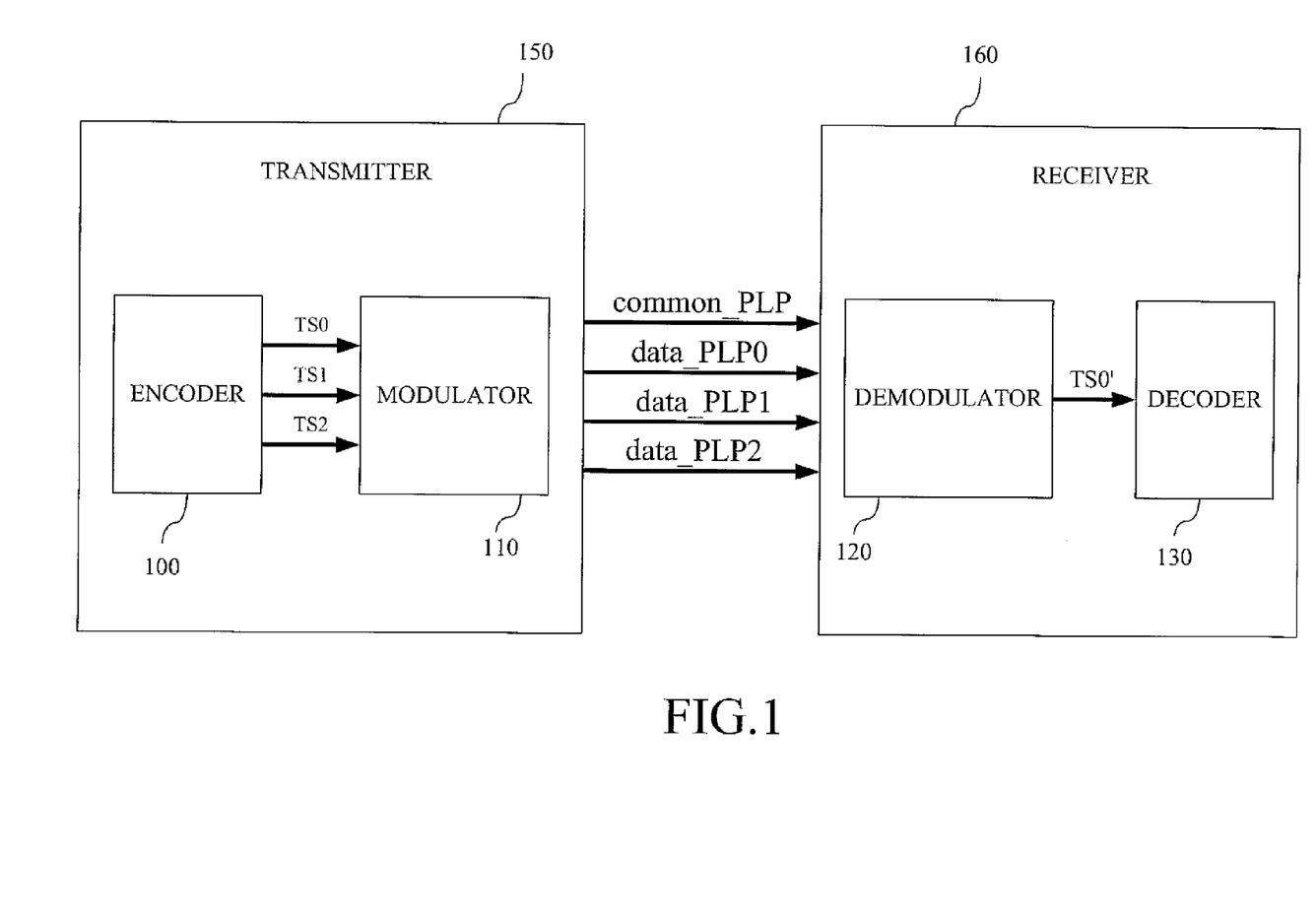
FIG. 1 is a schematic diagram of a DVB system.

FIG. 1 is a schematic diagram of a Digital Video Broadcasting (DVB) system. A transmitter 150 comprises an encoder 100 and a modulator 110, and a receiver 160 comprises a demodulator 120 and a decoder 130. The DVB system is inputted with one or a plurality of digital data streams, each of which is transmitted via a physical layer pipe (PLP) in the form of packet of 188 bytes. In a European DVB-T2 system, encoded transport streams TS0, TS1 and TS2 represent different program channels. Modulator 110 divides these encoded transport streams into data streams named data_PLP0, data_PLP1, data_PLP2, and a data stream named common_PLP. Data stream common_PLP contains common data packets commonly contained in the transport streams TS0, TS1 and TS2. Except for the common data packets and null packets, the data stream data_PLP0, data_PLP1 and data_PLP2 are data packets in the transport stream TS0, TS1 and TS2, respectively. Combining all the common data packets from different data streams as one data packet common_PLP for transmitting saves bandwidth occupied by repetitive transmission of the same data packets. A desired channel to be viewed is selected at the receiving end, e.g., the selected channel corresponds to the transport stream TS0. Accordingly, the demodulator 120 in the receiver 160 combines the data stream data_PLP0 corresponding to the transport stream TS0 with the data stream common_PLP, so as to reconstruct a transport stream TS0' compliant to the MPEG-2 specifications to the decoder 130. Therefore, in response to the DVB-T2 standards, an apparatus and a method capable of accurately reconstructing a transport stream as well as obtaining its output bit rate are in need.

SUMMARY OF THE PRESENT DISCLOSURE

According to an embodiment of the present disclosure, an apparatus for reconstructing a digital video data stream, is for reconstructing a transport stream from a first data stream and a second data stream. The first data stream and the second data stream comprise a plurality of packets, a plurality of input stream time reference (ISCR) values and a plurality of deleted null packet (DNP) values, where the ISCR values represent reference time points of packets that are processed and the deleted null packet values represent numbers of null packets between every two transmitted packets. The apparatus comprises a packet interval detector, for estimating a packet interval from the first data stream and the second data stream; an alignment unit, for generating an alignment signal according to the ISCR values and the packet interval; an oscillator, connected to the packet interval detector, for generating an output pulse signal; a reconstruction controller, for reconstructing the transport stream from the first data stream and the second data stream, and outputting the transport stream according to the alignment signal and the output pulse signal. The alignment unit comprises a fine tuner for fine tuning the frequency of the output pulse signal according to the ISCR values and a local count.

According to another embodiment of the present disclosure, a method for reconstructing a digital video data stream is for reconstructing a transport stream from a first data stream and a second data stream. The first data stream and the second data stream comprise a plurality of packets, a plurality of ISCR values, and a plurality of DNP values. The method comprises estimating a packet interval from the first data stream and the second data stream; aligning the first data stream and the second data stream according to the ISCR values and the packet interval; and reconstructing the transport stream from the aligned first data stream and second data stream and outputting the transport stream.

BRIEF DESCRIPTION OF THE DRAWINGS

The advantages and spirit related to the present disclosure can be further understood via the following detailed description and drawings.

DETAILED DESCRIPTION OF THE PREFERRED EMBODIMENT

Figure 2:
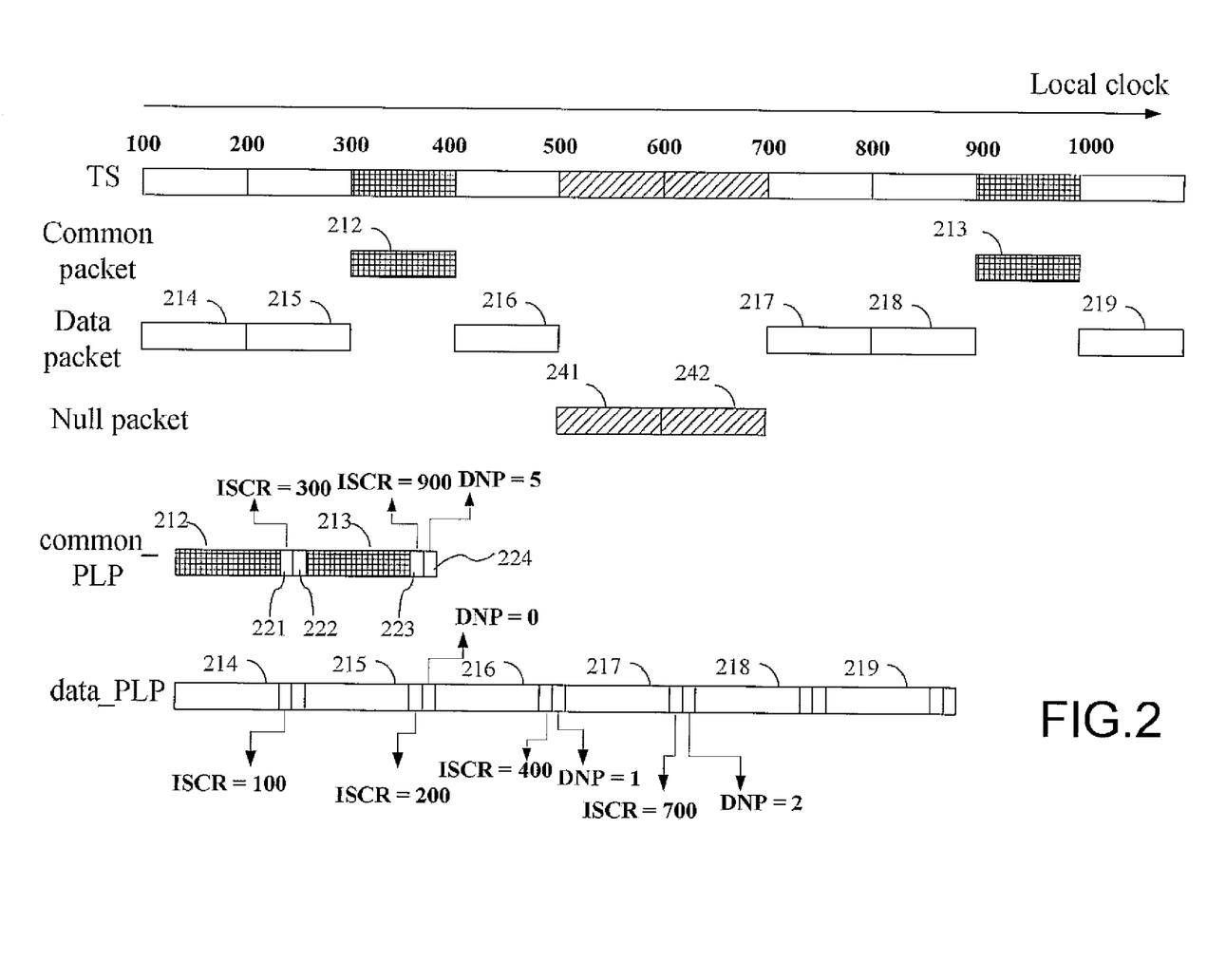
FIG. 2 is a schematic diagram illustrating division of a transport stream at a transmitting end into a common data stream and a data stream.

FIG. 2 is a schematic diagram illustrating a transport stream TS being divided into a common data stream common_PLP and a data stream data_PLP at a transmitting end. The horizontal axis represents a local clock count, e.g., the transport stream TS transmits a packet every 100 clocks. The transport stream TS comprises common packets 212 and 213, data packets 214 to 219, and null packets 241 and 242. The data stream common_PLP comprises the common packets 212 and 213, each of which is followed by two columns—the first column, representing an ISCR value, records a clock corresponding to a received packet, e.g., the first column has three bytes; and the second column represents a DNP value before the received packet, e.g., the second column has one byte. ISCR values represent reference time points of packets that are processed and the deleted null packet values represent numbers of null packets between every two transmitted packets.

In this embodiment, the common packet 212 of the transport stream TS is received when a local clock count is 300, and thus an ISCR column 221 attached to the common packet 212 indicates that the number of clocks is 300. The other common packet 213 of the transport stream TS is received when the local count is 900, and thus an ISCR column 223 attached to the common packet 213 indicates that the ISCR value is 900. Five packet intervals are between the common packet 212 and the common packet 213, such that a DNP column 224 attached to the common packet 213 indicates that the DNP value is 5. The data stream data_PLP comprises data packets 214 to 219; each of the data packets includes an attached ISCR column and a DNP column. When no null packets between two consecutive useful packets are removed, the DNP column records the DNP value as 0. The null packets 241 and 242 are not transmitted because they do not carry data. Null packets are generated and inserted when the transport stream TS is to be restored at a receiving end in order to obtain the same bit rate at the receiving as that at the transmitting end.

Figure 3:
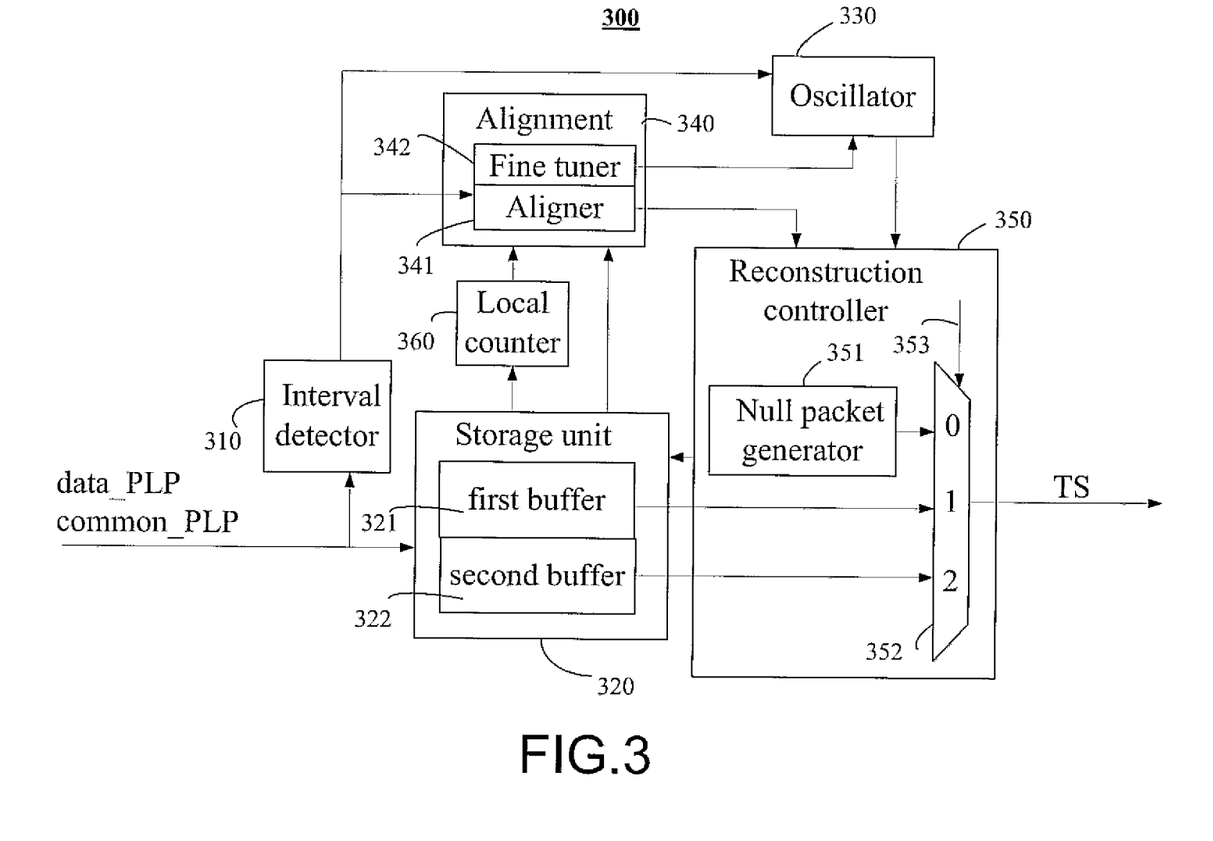
FIG. 3 is a block diagram of a digital video data stream reconstructing apparatus 300 in accordance with an embodiment of the present disclosure.

FIG. 3 is a block diagram showing a digital video data stream reconstructing apparatus 300 in accordance with an embodiment of the present disclosure. The digital video data stream reconstructing apparatus 300 allows reconstructing an output transport stream from a data stream data_PLP and a common data stream common_PLP. The digital video data stream reconstructing apparatus 300 comprises a packet interval detector 310, a storage unit 320, an oscillator 330, an alignment unit 340, a reconstruction controller 350, and a local counter 360. The packet interval detector 310 estimates a packet interval according to the data stream data_PLP and a common data stream common_PLP. In this embodiment, the storage unit 320 comprises a first buffer 321 and a second buffer 322, which are respectively for storing packets, ISCR values and DNP values of the data stream data_PLP and the common data stream common_PLP. For example, the storage unit 320 is realized by a built-in static random access memory (SRAM) or an external dynamic random access memory (DRAM). The first buffer 321 and the second buffer 322 respectively comprise a first read/write pointer and a second read/write pointer pointing to addresses to be accessed. The oscillator 330 generates an output pulse signal to determine a frequency of an output transport stream, and is realized by a numerically-controlled oscillator (NCO). The packet interval detector 310 transmits the detected packet interval to the oscillator 340 to serve as an initial period of the output pulses of the oscillator 330. The alignment unit 340 comprises an aligner 341 and a fine tuner 342. The aligner 341 aligns the data stream data_PLP and the common data stream common_PLP according to the ISCR values and the packet interval, and outputs an alignment signal to the reconstruction controller 350. Although the same bit rate of the transport stream at the receiving end as that of the transport stream at transmitting end is desired, an inconsistency problem in fact exists between the clock rate at the receiving end and that at the transmitting end. Preferably, the fine tuner 342 is implemented to fine tune the output frequency of the oscillator 330. After the aligner 341 completes alignment estimation, the fine tuner 342 provides an estimated alignment value to the oscillator 330 according to the difference between an ISCR value corresponding to an aligned packet and the local clock when the aligned packet is outputted, so as to adjust the frequency of the output clock of the oscillator 330. Accordingly, the ISCR value corresponding to the outputted packet is synchronized with the corresponding local clock when the aligned packet is outputted; that is, the bit rate of the reconstructed transport stream output is the same as that of the transport stream at the transmitting end.

The reconstruction controller 350 comprises a null packet generator 351 and a multiplexer 352. The aligner 341 transmits the alignment signal to the reconstruction controller 350, which controls the first read/write pointer and the second read/write pointer according to the alignment signal, and controls the multiplexer 352 with a reconstruction control signal 353 to selectively output a corresponding packet each time when one clock of one output pulse signal is received, so as to reconstruct the transport stream. After the aligner 341 performs alignment, the reconstruction controller 350 will not simultaneously access packets of the common data stream common_PLP and the data stream data_PLP at a given time point. In one embodiment, at time points when no corresponding packet is outputted, the reconstruction controller 350 controls the null packet generator 351 with the reconstruction control signal 353 to output a null packet, so as to reconstruct the transport stream inputted to the transmitting end. In some embodiments, the null packet generator 351 generates the null packet according to the DNP values read from the first buffer 321 and second buffer 322. The local counter 360 is for generating a local count.

Figure 4:
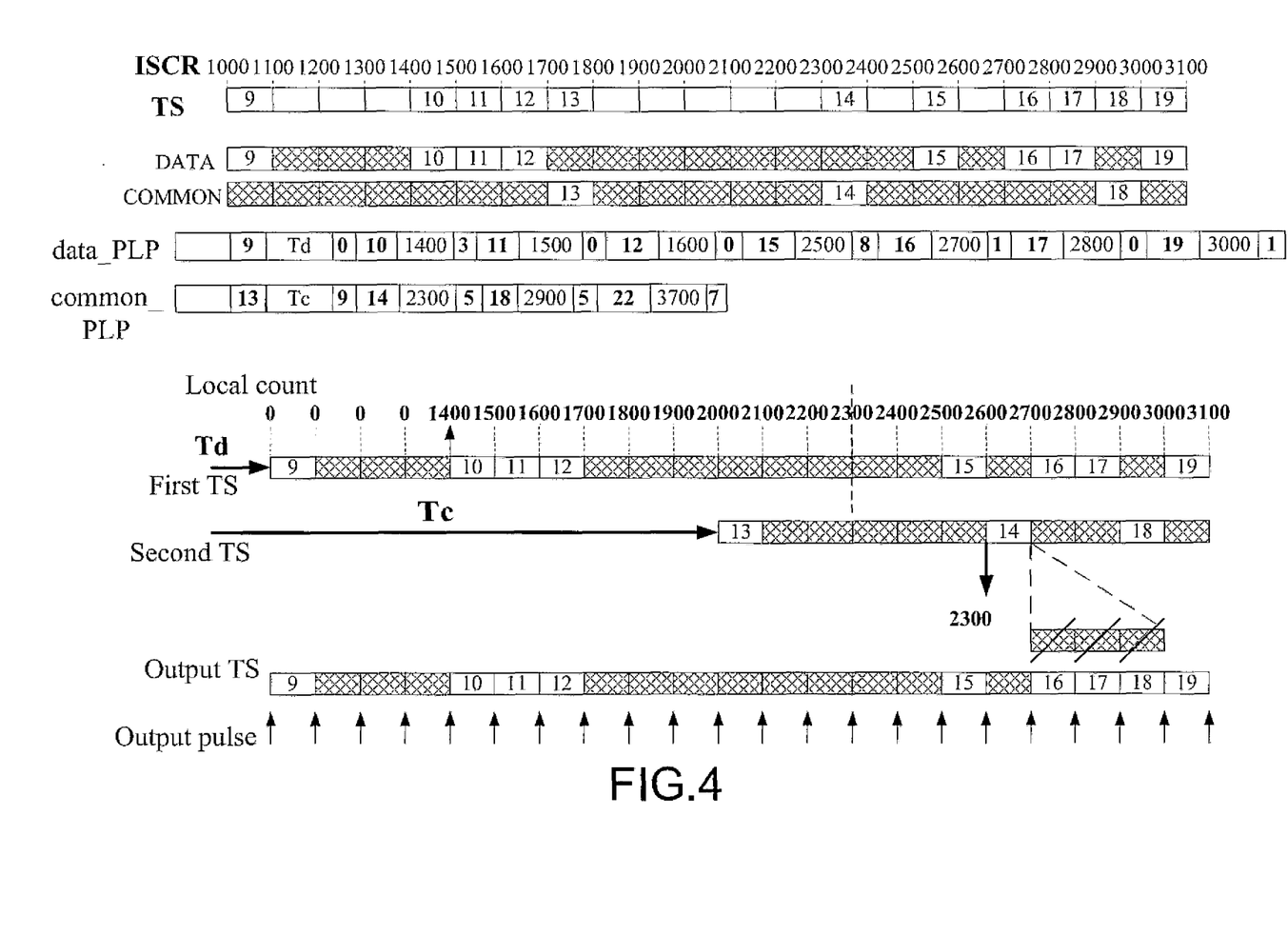
FIG. 4 is a schematic diagram illustrating reconstruction of a data stream and a common data stream into a transport stream via an ISCR column.

FIG. 4 is a schematic diagram illustrating reconstruction of a transport stream from a data stream data_PLP and a common data stream common_PLP via the ISCR column. Referring to both FIG. 3 and FIG. 4, the packet interval detector 310 respectively detects a packet interval of the data stream data_PLP and the common data stream common_PLP of a received transport stream, e.g., the packet interval represents the number of clocks between two received packets. Preferably, ISCR and DNP column values are applied to detect the packet interval of the received transport stream. For example, from the DNP value 0 of packet 11 of the data stream data_PLP, no other packets are transmitted between packet 10 and packet 11; and from the difference of 100 between the ISCR values of packet 10 and packet 11, it is known that the transmission of the packet 10 takes 100 clocks, so that the packet interval is 100. As another example, DNP value of a packet 18 of the common data stream common_PLP reads 5, therefore, five null packets are transmitted between packet 14 and packet 18; and from the difference of 600 between the ISCR values of packet 14 and packet 18, it is known that the transmission of six packets takes 600 clocks, so that each packet interval is 100.

Referring to FIG. 4, the first packet 9 of the data stream data_PLP has an ISCR value Td, which means that the aligner 341 starts to access packet information of the first buffer 321 in sequence after a time of Td, as shown in FIG. 3. In this embodiment, a first transport stream is generated from the packet information of the first buffer 321. Likewise, the first packet 13 of the common data stream common_PLP has an ISCR value Tc, which means that the aligner 341 starts to access packet information of the second buffer 322 in sequence after a time of Tc. In this embodiment, a second transport stream is generated from the packet information of the second buffer 322. Since a difference between the times Td and Tc is not equal to a time difference between the first packets of data stream data_PLP and the common data stream common_PLP, the aligner 341 needs to align the accessed first and second transport streams to accurately reconstruct the transport stream. Supposing that Td is smaller than Tc, the aligner 341 first starts to access the packet information of the first buffer 321 after the time Td. When a packet 10 with an ISCR value 1400 is accessed, the aligner 341 loads the ISCR value 1400 to the local counter 360, which then starts to count from 1400.

In this embodiment, the first transport stream may represent transport streams whose corresponding ISCR values are accessed earlier, and the second transport stream may represent another transport stream whose corresponding ISCR values are accessed later. When the ISCR value 1400 is loaded to the local counter 360, it means that the local clock corresponding to packet 10 is 1400. According to the packet interval detected by the packet interval detector 310, a packet is accessed every 100 clocks, such that the accessed first transport stream is synchronized with a local clock. Supposing that the clock rate of the local counter 360 is the same as that of the transmitting end, the local clock theoretically synchronizes with the ISCR value. After time Tc, the aligner 341 starts to access the packet information of the second buffer 322. When the first packet (i.e., packet 14) with an ISCR column is accessed, the aligner 341 compares the ISCR value 2300 with the current local count 2600 to determine that the second transport stream lags the first transport stream by 300 clocks according to the difference between the ISCR value and the current local count. According to the packet interval of 100 clocks, the second transport stream is three packet intervals behind the first transport stream. In order to align the first and second transport streams to reconstruct the transport stream TS, it is necessary to skip three packet intervals for the packets after packet 14 of the second transport stream to synchronize with a local count and align with the first transport stream. The following packet 18 in the second buffer 322 has a DNP value of 5, which means five packet intervals exist between packet 18 and packet 14. In order to align the first transport stream and the packets in the second transport stream, the aligner 341 has to skip three packet intervals between packet 14 and packet 18; that is, packet 18 is accessed after two packet intervals from packet 14 is accessed. It is to be noted that, the packets in the second stream will not be outputted until the alignment is done, and, before alignment is complete, only packets in the first transport stream are outputted. It is depicted from the transport stream that a packet 13 and the packet 14 of the second transport stream are ignored. Preferably, in another embodiment, both the first and second transport streams are not outputted until the alignment is completed, which means incomplete partial transport streams are discarded before the alignment is completed.

Figure 5:
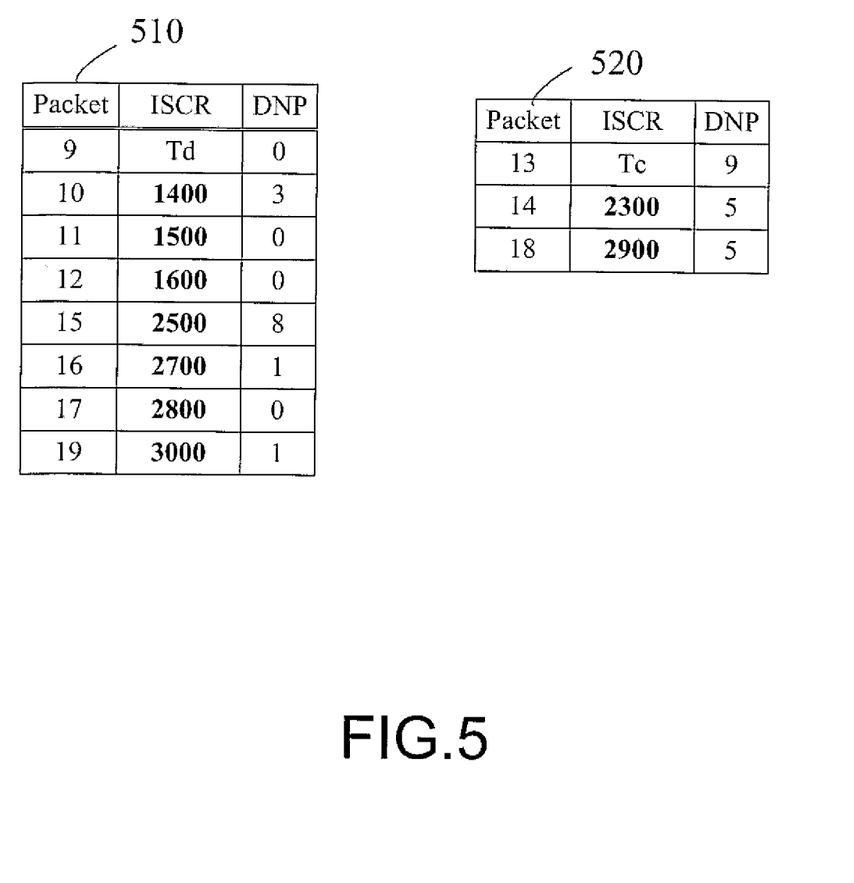
FIG. 5 is a schematic diagram of data of data streams in FIG. 4.

FIG. 5 is a schematic diagram of data streams in FIG. 4. Data 510 and 520, respectively representing the data stream data_PLP and the common data stream common_PLP in FIG. 4, comprise packets, ISCR values and DNP values. In this embodiment, as shown in FIG. 3 and FIG. 5, data 510 and 520 are respectively stored into the first buffer 321 and the second buffer 322 of the storage unit 320. More specifically, the first buffer 321 stores data 510 including packets, ISCR values and DNP values of the data stream data_PLP, and the second buffer 322 stores data 520 including packets, ISCR values and DNP values of the common data stream data_PLP.

Figure 6:
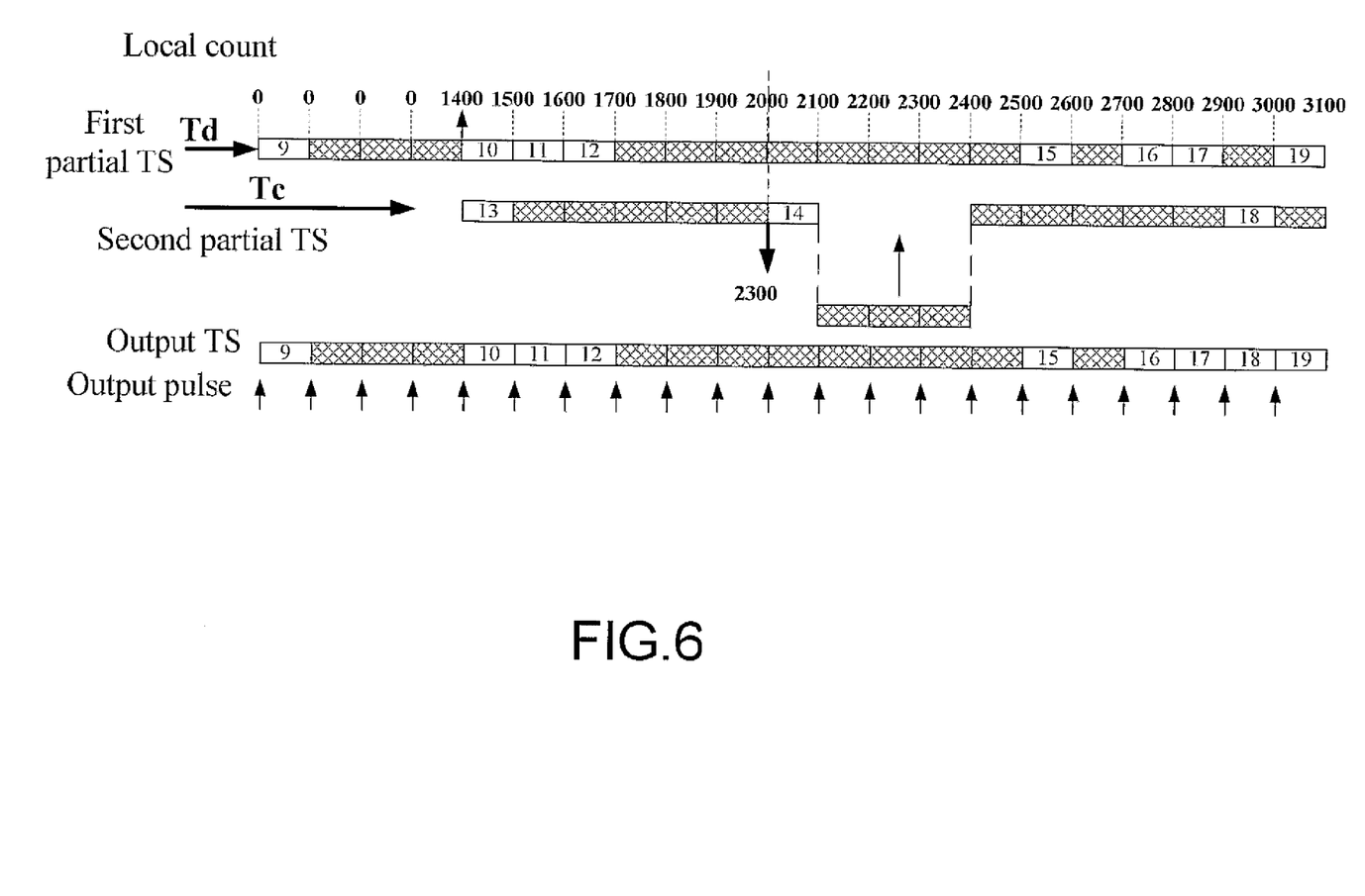
FIG. 6 is a timing diagram of packets being aligned in accordance with another embodiment of the present disclosure.

FIG. 6 is a timing diagram of the alignment of packets in accordance with another embodiment of the present disclosure. Referring to FIG. 3 and FIG. 6, in this embodiment, the aligner 341 accesses the first packet 14 with the ISCR value of 2300 in the second buffer 322. However, a current local count is 2000 at this point, meaning that the second transport stream is three packet intervals ahead of the first transport stream. Therefore, after the packet 14, the second transport stream needs to wait for three packet intervals before accessing next packet in order to align with the first transport stream.

Figure 7:
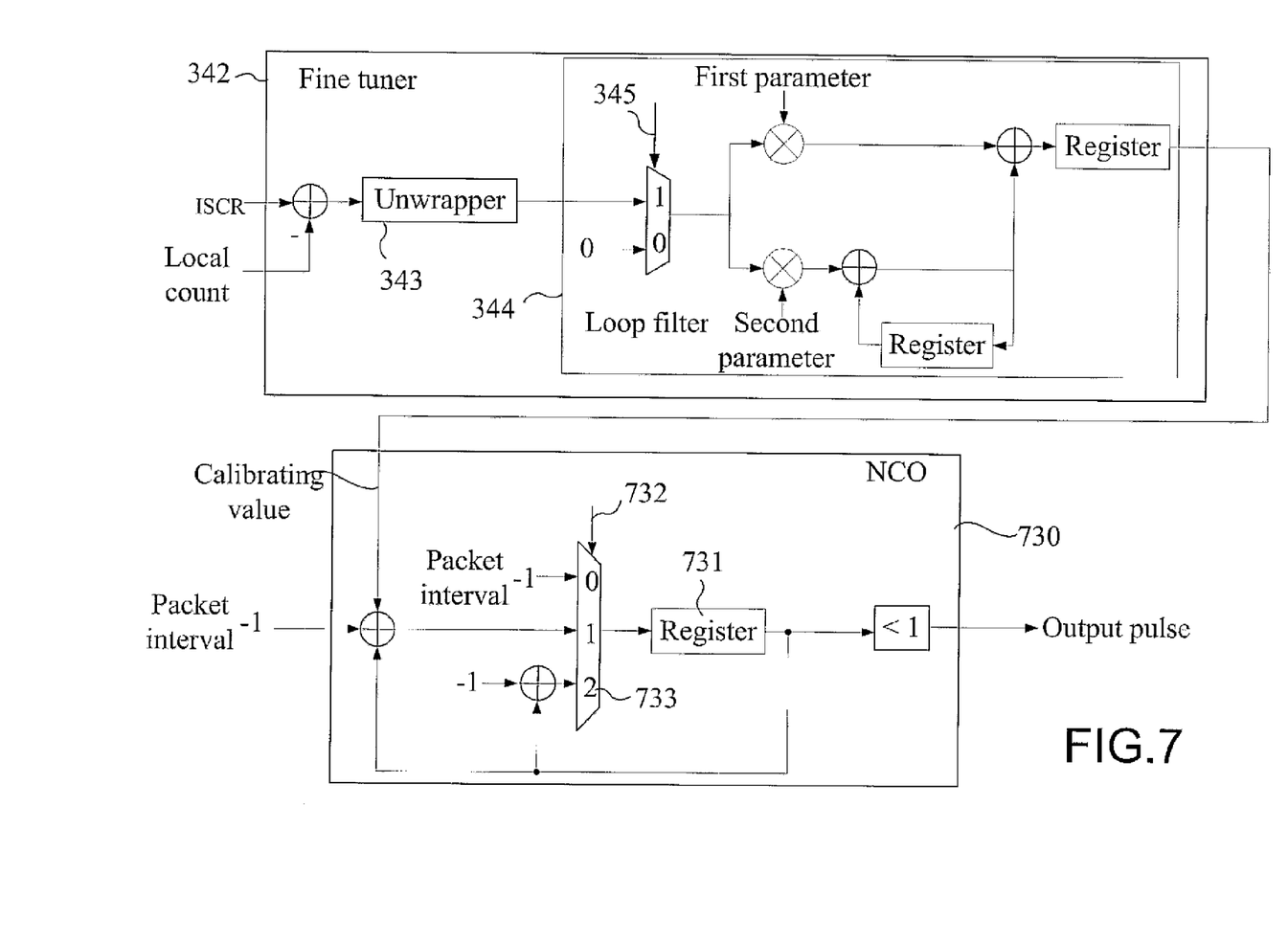
FIG. 7 is a circuit diagram of an oscillator and a fine tuner in accordance with the embodiment of the present disclosure in FIG. 3.

FIG. 7 is a circuit diagram of the oscillator 330 and the fine tuner 342 in accordance with the embodiment of the present disclosure in FIG. 3. In this embodiment, the oscillator 330 is realized by an NCO 730, which comprises a multiplexer 733 and generates an NCO count to be stored into a register 731 according to an output controlled by a control signal 732. When the NCO 730 receives an initial value, the control signal 732 selects path 0 to output the value of packet interval substracting by 1. When the NCO count is smaller than 1, the control signal 732 selects path 1; otherwise, the control signal 732 selects path 2. In this embodiment, the initial value is 99 (100−1=99), the NCO count is subtracted by 1 via path 2 every local clock, and the subtracted NCO count is stored into the register 731. After 99 local clock cycles, the NCO count is 0, which is smaller than 1, so the NCO 730 generates an output pulse. Then, via the path 1, the NCO count is added by 99, and the foregoing steps are repeated, such that the NCO 730 generates output clocks comprising an interval that is 100 local clocks.

The fine tuner 342 fine tunes an output frequency according to the difference between an ISCR value of an output packet and a local count. The fine tuner 342 comprises an unwrapper 343 and a loop filter 344. The unwrapper 343 detects the difference between the ISCR value and the local count that are unwrapped, e.g., the local count and the ISCR value are cycle counts within a range of 0 to 999. Accordingly, if the local count is 998, the ISCR value is 1, then the difference is 3 (1+1000−998=3) but not 997 (998−1=997). The loop filter 344 calculates a weighted average of differences stored at different time points, with weights being determined according to a first parameter and a second parameter and the weighted average being stored in a register to gradually adjust the output frequency of the NCO 730. A control signal 345 controls an input value of the loop filter 344.

Figure 8A:
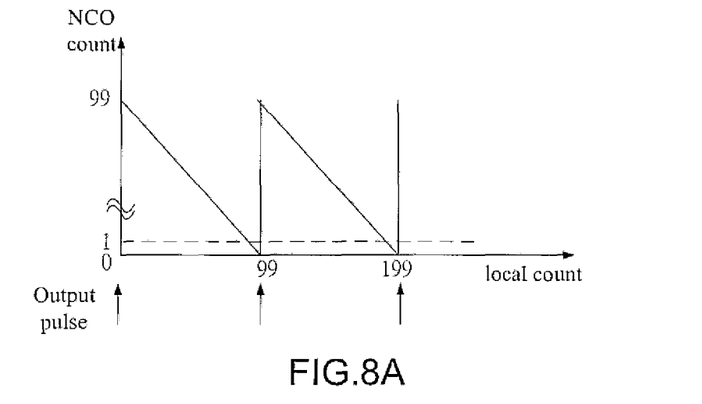
FIG. 8A and FIG. 8B are schematic diagrams of relationships between numerically controller oscillator (NCO) counts and output clocks.
Figure 8B:
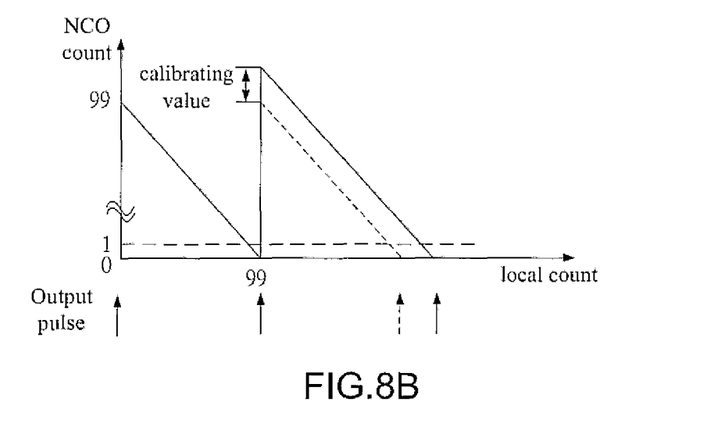
Figure 9:
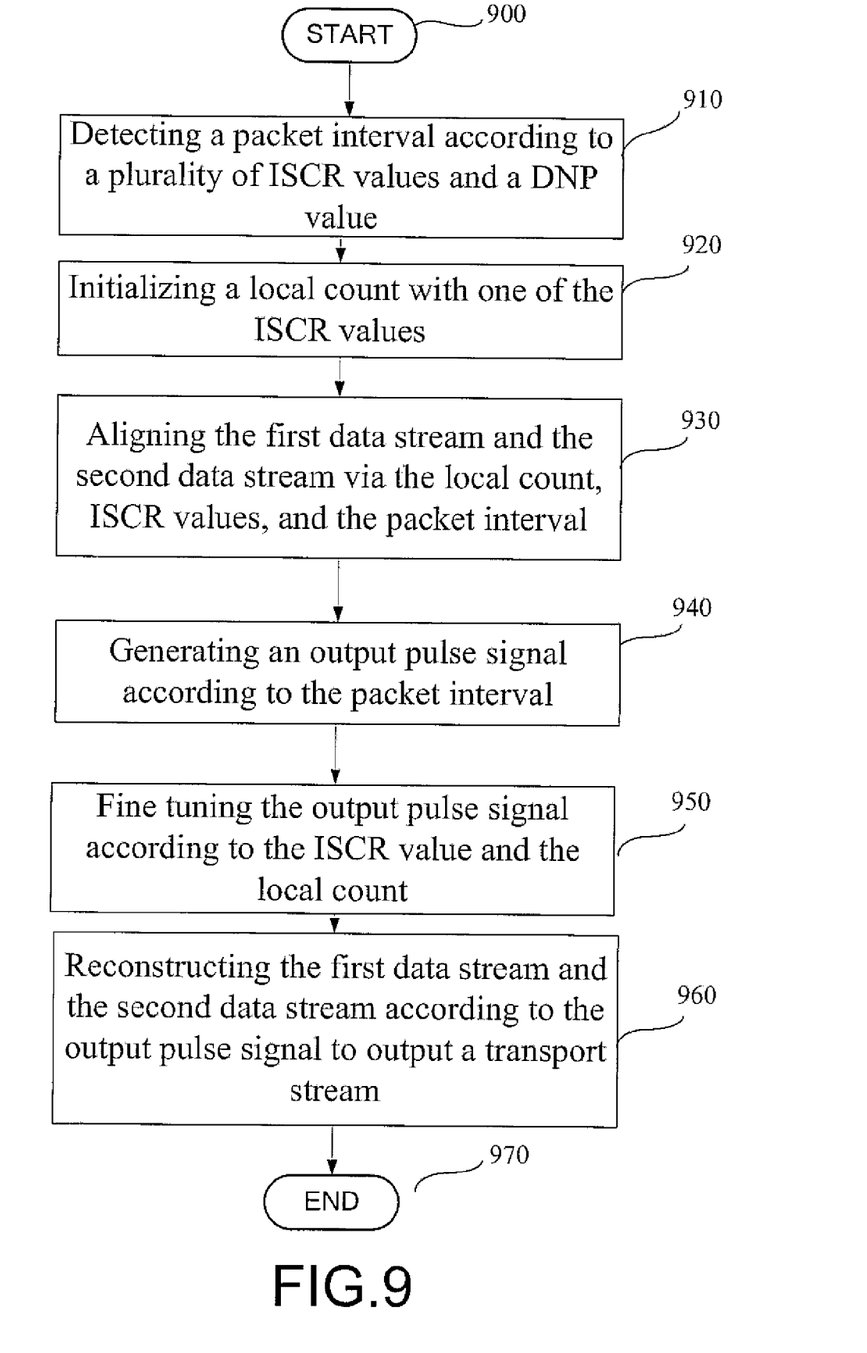
FIG. 9 is a flow chart of a method for reconstructing a digital video data stream in accordance with yet another embodiment of the present disclosure.

FIG. 8A is a schematic diagram of the NCO 730, which is not yet fine tuned and has a fixed output clock interval of 100 counts. For example, a packet, being accessed at local count 500, has an ISCR value 501; it means that the clock rate at the receiving end is slightly faster than that at the transmitting end. Therefore, the fine tuner 342 is used to slow down the output clock frequency of the NCO 730. A calibrating value greater than 0, outputted by the fine tuner 342, is added to a start point (i.e., path 1) of each cycle of NCO counts, so that the periods of the output pulses of the NCO 730 are extended. FIG. 8B is a schematic diagram of a fine tuned NCO 730. Likewise, when the clock rate at the receiving end is slower than that at the transmitting end, the fine tuner 342 outputs a calibrating value smaller than 0 to reduce periods of an output pulse signal. Accordingly, the foregoing fine tuning steps achieves an object that the bit rate at the receiving end is the same as that at the transmitting end when the ISCR value corresponding to the output packet is the same as the corresponding local count FIG. 9 is a flow chart of a method for reconstructing a digital video data stream in accordance with an embodiment of the present disclosure. In the DVB-T2 standards, a transport stream at a transmitting end is divided into a first data stream and a second data stream to be transmitted to a receiving end. The first data stream and the second data stream comprise a plurality of packets, a plurality of ISCR values, and a plurality of DNP values. The packets of the first data stream and the second data stream respectively correspond to the first transport stream and the second transport stream, which are to be aligned at the receiving end to reconstruct and the output transport stream. Preferably, a data stream whose ISCR values are accessed earlier is defined as the first data stream, and the corresponding packet stream is a first transport stream. The digital video data stream reconstructing method of the present embodiment begins with Step 900. In Step 910, detecting the packet interval according to a plurality of ISCR values and a DNP value. A time difference is first obtained according to two ISCR values, and duration of each packet interval is generated from dividing the time difference by the number of transmission packets indicated by the DNP value. In Step 920, initializing a local count according to an ISCR value. Preferably, the first ISCR value of accessed first data stream is regarded as an initial value. Supposing that a local count rate is the same as that at the transmitting end, the ISCR values of the first data stream are synchronized with the local count. In practical applications, the local count rate is a little different from the count rate at the transmitting end. In Step 930, aligning the first data stream and the second data stream via the local count, ISCR values, and the packet interval. Since the local count is initialized by the ISCR value of the first data stream, the difference between the ISCR value of the second data stream and the local count represents the time difference between the first data stream and the second data stream. Alternatively, the ISCR values of the first data stream and the second data stream may be compared to obtain the time difference. The alignment is performed according to the time difference and the packet interval, e.g., deciding whether it is necessary to delete/add null packets from/to the second transport stream; for instance, such determination may be realized by changing the read/write pointer accessing the second transport stream. In Step 940, generating an output pulse signal according to the packet interval. The output pulse signal determines an output rate of the aligned transport stream. Thus, the packet interval generated at the transmitting end is used to coarsely determine period of the output pulse signals. In Step 950, fine-tuning the output pulse signal according to the ISCR value and the local count. Since the local count rate of the receiving end is slightly different from that at the transmitting end, and since the ISCR value represents a clock count at the transmitting end, the output pulse signal from an oscillator is fine tuned according to the difference between the ISCR value and the local count at the receiving end. This way the output bit rate of the reconstructed transport stream is the same as the transmission rate at the transmitting end. In Step 960, reconstructing the transport stream from the first data stream and the second data stream according to the output pulse signal to output a transport stream. In Step 970, the flow ends.

It is to be noted that, in practical applications, in order to save bandwidth, not all packets of a data stream at a transmitting end comprise an ISCR value; however, such situation is still applicable to the present disclosure. To detect the packet interval, in one data stream, DNP values of all the packets between two packets comprising an ISCR column are added up to obtain the number of transmission packets during the time difference between the ISCR values. In an embodiment, a data stream with an ISCR column accessed earlier is the first data stream, and a data stream with an ISCR column accessed later is the second data stream. Packets of the first data stream correspond to the first transport stream, and packets of the second data stream correspond to the second transport stream. According to the first ISCR column accessed in the second data stream, the second transport stream is aligned with the first transport stream; alternatively, a predetermined type of partial transport stream can be are regarded as the first transport stream, and an alignment of the transport stream is then realized according to the foregoing embodiment. After the alignment, an output rate is calibrated according to successively received ISCR column values. Therefore, the present disclosure can be realized even though not every packet of the transport stream comprises an ISCR value.

In conclusion, an apparatus for reconstructing a digital video data stream, provided by the present disclosure, is for reconstructing a first data stream and a second data stream into a transport stream. The first data stream and the second data stream respectively comprise a plurality of packets, a plurality of ISCR values and a plurality of DNP values. The digital video data stream reconstructing apparatus comprises a packet interval detector, for detecting a packet interval according to the first data stream and the second data stream; an alignment unit, for generating an alignment signal according to the ISCR values and the packet interval; an oscillator, coupled to the packet interval detector, for generating an output pulse signal; and a reconstruction controller, for reconstructing the transport stream from the first data stream and the second data stream according to the alignment signal and the output pulse signal and for outputting the transport stream. The alignment unit comprises a fine tuner for fine tuning a frequency of the output pulse signal according to the ISCR values and a local count.

A method for reconstructing a digital video data stream, provided by the present disclosure, is for reconstructing a first data stream and a second data stream into a transport stream. The first data stream and the second data stream respectively comprise a plurality of packets, a plurality of ISCR values and a plurality of DNP values. The method for reconstructing the digital video data stream comprises detecting a packet interval according to the first data stream and the second data stream; aligning the first data stream and the second data stream according to the ISCR values and the packet interval; and reconstructing the aligned first and second data streams to output the transport stream.

While the disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An apparatus implemented at a receiving end of a video broadcasting system and for reconstructing a transport stream, among a plurality of transport streams being sent from a transmitting end of the video broadcasting system, from a first data stream and a second data stream, each of which comprising a plurality of packets, a plurality of input stream time reference (ISCR) values to represent reference time points of the packets in numbers of clocks, and a plurality of null packet (DNP) values to represents numbers of null packets between consecutive packets, the apparatus comprising:

a packet interval detector that detects a packet interval according to the first data stream and the second data stream, the packet interval detector configured to: determine a clock difference in the ISCR values of two consecutive received packets; determine a number of packets between the received packets from a DNP value associated with the received packets; and detect the packet interval as a number of clocks between the two received packets based on the determined ISCR difference and DNP value:

an alignment unit, that generates aligns the first data stream and the second data stream using an alignment signal according to the ISCR values and the packet interval;

an oscillator, coupled to the packet interval detector, that generates an output pulse signal; and a reconstruction controller, that reconstructs the transport stream from the first data stream and the second data stream according to the alignment signal and the output pulse signal, and outputs the transport stream, wherein one of the first and the second data streams contains common data commonly contained in the transport streams from the transmitting end, and one of the first and the second data streams contains data only contained in the transport stream to be reconstructed.

2. The apparatus as claimed in claim 1, further comprising a storage unit that stores the packets, the ISCR values, and the DNP values.

3. The apparatus as claimed in claim 1, further comprising a storage unit that comprises a first buffer that stores the first data stream packets and associated ISCR and DNP values, and a second buffer that stores the second data stream packets and associated ISCR and DNP values, wherein the packet interval detector and the alignment unit are each configured to access the ISCR and DNP values from the first and second buffers to perform respective packet interval detector operations and alignment unit operations.

4. The apparatus as claimed in claim 1, wherein the reconstruction controller comprises a null packet generator that generates a plurality of null packets.

5. The apparatus as claimed in claim 4, wherein the reconstruction controller further comprises a multiplexer that selectively outputs the packets and the null packets according to a reconstruction control signal.

6. The apparatus as claimed in claim 1, further comprising a local counter that generates a local count.

7. The apparatus as claimed in claim 6, wherein the oscillator generates an output pulse signal according to the local count and the packet interval.

8. The apparatus as claimed in claim 6, wherein the local counter is initialized by one of the ISCR values.

9. The apparatus as claimed in claim 8, wherein the alignment unit generates the alignment signal further according to the local count, the ISCR values, and the packet interval.

10. The apparatus as claimed in claim 8, wherein the alignment unit comprises an aligner and a fine tuner, wherein the aligner generates the alignment signal according to the local count, the ISCR values, and the packet interval, wherein the fine tuner fine tunes a frequency of the output pulse signal according to the ISCR values and the local count.

11. The apparatus as claimed in claim 1, being applied to a receiving end of a Digital Video Broadcasting (DVB) system, 12. The apparatus as claimed in claim 1, wherein the packet interval detector is further configured to divide the clock difference by the number of packets between the received packets to detect the packet interval.

13. A method implemented at a receiving end of a video broadcasting system and for reconstructing a transport stream, among a plurality of transport streams being sent from a transmitting end of the video broadcasting system, from a first data stream and a second data stream, each of the first data stream and the second data stream comprising a plurality of packets, a plurality of input stream time reference (ISCR) values in numbers of clocks, and a plurality of null packet (DNP) values to represents numbers of null packets between consecutive packets, the method comprising:

detecting a packet interval according to the first data stream and the second data stream, the detecting including: determining a difference between ISCR values of two consecutive received packets determining a number of packets between the received packets from a DNP value associated with the received packets; and detecting the packet interval as a number of docks between the two received packets based on the determined ISCR difference and DNP value:

aligning the first data stream and the second data stream according to the ISCR values and the packet interval;

reconstructing the transport stream from the aligned first and second data streams; and outputting the transport stream, wherein one of the first and the second data streams contains common data commonly contained in the transport streams from the transmitting end and one of the first and the second data streams contains data only contained in the transport stream to be reconstructed.

14. The method as claimed in claim 13, further comprising initializing a local count with one of the LSCR values.

15. The method as claimed in claim 14, wherein aligning the first data stream and the second data stream comprises aligning the first data stream and the second data stream according to the local count, the ISCR values, and the packet interval.

16. The method as claimed in claim 13, further comprising generating an output pulse signal according to the packet interval.

17. The method as claimed in claim 16, wherein generating the output pulse signal comprises generating the output pulse signal via a numerically controlled oscillator (NCO).

18. The method as claimed in claim 16, wherein reconstructing the transport stream comprises reconstructing from the first and the second data streams according to the output pulse signal.

19. The method as claimed in claim 16, further comprising fine tuning the output pulse signal according to the ISCR values and a local count.

20. The method as claimed in claim 13, further comprising: storing the first data stream packets and associated ISCR and DNP values in a first storage unit buffer and storing the second data stream packets and associated ISCR and DNP values in a second buffer, wherein the detecting a packet interval and the aligning each include accessing the stored ISCR and DNP values from the first and second buffers.

* * * * *